(12) United States Patent
Markusch et al.

(10) Patent No.: US 6,482,913 B1
(45) Date of Patent: Nov. 19, 2002

(54) LIQUID MDI ADDUCTS WTIH IMPROVED FREEZE STABILITY

(75) Inventors: Peter H. Markusch, McMurray, PA (US); Richard S. Pantone, New Martinsville, WV (US); Ralf Guether, Pittsburgh, PA (US); William E. Slack, Moundsville, WV (US)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/499,316

(22) Filed: Feb. 7, 2000

(51) Int. Cl.[7] .......................... C08G 18/70; C08G 18/00; C09K 3/00
(52) U.S. Cl. .................... 528/67; 252/182.22; 521/160
(58) Field of Search ....................... 528/67; 252/182.22, 252/528; 521/160

(56) References Cited

U.S. PATENT DOCUMENTS

| | | | |
|---|---|---|---|
| 3,152,162 A | 10/1964 | Fischer et al. | 260/453 |
| 3,384,653 A | 5/1968 | Erner et al. | 260/453 |
| 3,449,256 A | 6/1969 | Farrissey, Jr. | 252/182 |
| 3,640,966 A | 2/1972 | Hennig et al. | 260/77.5 R |
| 3,641,093 A | 2/1972 | Brooks et al. | 260/453 AR |
| 3,644,457 A | 2/1972 | König et al. | 260/453 SP |
| 3,701,796 A | 10/1972 | Saaty et al. | 260/453 SP |
| 3,883,571 A | 5/1975 | Allport et al. | 260/453 AM |
| 4,014,935 A | 3/1977 | Ibbotson | 260/566 R |
| 4,031,026 A | 6/1977 | Ibbotson | 252/182 |
| 4,055,548 A | 10/1977 | Carleton et al. | 260/77.5 AT |
| 4,088,665 A | 5/1978 | Findeisen et al. | 260/453 AM |
| 4,102,833 A | 7/1978 | Salisbury | 521/159 |
| 4,115,429 A | 9/1978 | Reiff et al. | 260/453 SP |
| 4,118,411 A | 10/1978 | Reiff et al. | 260/453 SP |
| 4,154,752 A | 5/1979 | Sundermann et al. | 260/453 SP |
| 4,160,080 A | 7/1979 | Koenig et al. | 528/59 |
| 4,177,205 A | 12/1979 | Schaaf et al. | 260/453 AM |
| 4,229,347 A | 10/1980 | Holt et al. | 260/239 A |
| 4,261,852 A | 4/1981 | Carroll et al. | 528/59 |
| 4,321,333 A | 3/1982 | Alberino et al. | 521/159 |
| 4,332,742 A | 6/1982 | Allen | 260/453 SP |
| 4,442,235 A | 4/1984 | Taylor et al. | 521/122 |
| 4,448,904 A | 5/1984 | Dominguez | 521/160 |
| 4,478,960 A | * 10/1984 | Buethe et al. | 521/160 |
| 4,490,300 A | 12/1984 | Allen et al. | 260/453 SP |
| 4,490,301 A | 12/1984 | Pantone et al. | 260/453 SP |
| 4,490,302 A | 12/1984 | Ma et al. | 260/453 AM |
| 4,539,156 A | 9/1985 | Dewhurst et al. | 260/453 SP |
| 4,539,158 A | 9/1985 | Dewhurst et al. | 260/453 SP |
| 4,738,991 A | 4/1988 | Narayan | 521/124 |
| 4,866,103 A | 9/1989 | Cassidy et al. | 521/159 |
| 4,876,292 A | * 10/1989 | Milliren | 521/159 |
| 4,883,909 A | 11/1989 | Slack | 560/351 |
| 4,910,333 A | 3/1990 | Slack | 560/351 |
| 5,070,114 A | * 12/1991 | Watts et al. | 521/159 |
| 5,240,635 A | 8/1993 | DeGenova et al. | 252/182.21 |
| 5,246,977 A | 9/1993 | Mussini | 521/159 |
| 5,319,053 A | 6/1994 | Slack et al. | 528/48 |
| 5,319,054 A | 6/1994 | Slack et al. | 528/48 |
| 5,369,138 A | * 11/1994 | Gansen | 521/159 |
| 5,440,003 A | 8/1995 | Slack | 528/48 |
| 5,521,225 A | * 5/1996 | Gerber et al. | 521/155 |
| 5,610,260 A | 3/1997 | Schmalstieg et al. | 528/49 |
| 5,663,272 A | 9/1997 | Slack et al. | 528/69 |
| 5,783,652 A | * 7/1998 | Rosthause et al. | 528/48 |
| 5,874,485 A | * 2/1999 | Mlliren et al. | 521/160 |

FOREIGN PATENT DOCUMENTS

| | | |
|---|---|---|
| EP | 819 715 | 1/1998 |
| EP | 844 276 | 5/1998 |
| GB | 994890 | 6/1965 |
| JP | 71-99176 | 9/1973 |

* cited by examiner

Primary Examiner—Alan L. Rotman
Assistant Examiner—Taylor V. Oh
(74) Attorney, Agent, or Firm—Joseph C. Gil; N. Denise Brown

(57) ABSTRACT

This invention relates to liquid polyisocyanate compositions having improved freeze stability. These liquid polyisocyanate compositions have an NCO group content of 15 to 30%, and comprise (A) an allophanate-modified MDI and having an NCO group content of 16 to 32.5%, (B) a low molecular weight branched aliphatic dihydroxy compound, and (C) an epoxide functional compound which is present in an amount of 0.01 to 1% by weight, based on the combined weight of components (A) and (B).

10 Claims, No Drawings

LIQUID MDI ADDUCTS WITH IMPROVED FREEZE STABILITY

BACKGROUND OF THE INVENTION

This invention relates to a stable liquid polyisocyanate composition having an improved freeze stability which contains an NCO group content of 15 to 30% and a monomeric diphenylmethane diisocyanate content of less than 90%. These compositions comprise (A) an allophanate modified MDI having an NCO group content of 16 to 32.5%, (B) a low molecular weight branched aliphatic dihydroxy compound, and (C) an epoxide functional compound in an amount of from 0.01 to 1% by weight, based on the combined weight of (A) and (B). This invention also relates to a process for the preparation of these stable liquid polyisocyanate compositions.

Diisocyanates that are liquid at room temperature have numerous advantages over solid diisocyanates. The most commercially important diisocyanates that are solid at room temperature are 4,4'-diphenyl-methane diisocyanate and 2,4'-diphenylmethane diisocyanate. Numerous patents have issued relating to the liquification of diphenylmethane diisocyanates (MDI).

One common route to liquification of MDI is through carbodiimidizations. Typical of this route are the processes described in, for example, U.S. Pat. Nos. 3,152,162, 3,384,653, 3,449,256, 3,640,966, 3,641,093, 3,701,796, 4,014,935 4,088,665, 4,154,752 and 4,177,205.

The most common technique to liquify MDI is through the reaction with various hydroxyl functional materials. The prior art has described numerous types of liquid isocyanates. These include both (1) reaction products of (i) MDI or modified MDI with (ii) hydroxyl functional materials such as are described in, for example, U.S. Pat. Nos. 3,644,457, 3,883,571, 4,229,347, 4,055,548, 4,102,833, 4,332,742, 4,448,904, 4,490,301, 4,490,302, 4,539,156, 4,539,158, 4,883,909, 4,442,235 and 4,910,333, as well as (2) mixtures of (i) a reaction product of MDI or modified MDI and hydroxyl functional materials, with (ii) MDI, PMDI or modified MDI, such as are described in, for example, U.S. Pat. Nos. 4,031,026, 4,261,852, 4,321,333, 5,240,635 and 5,246,977.

U.S. Pat. No. 3,644,457 discloses organic diisocyanates and specifically, mixtures of organic diisocyanates which are liquid at room temperature. These compositions comprise the reaction product of solid 4,4'- and/or 2,4'-diphenylmethane diisocyanate with a branched aliphatic dihydroxy compound in a molar ratio of 0.1 to 0.3 mol of dihydroxy compound per mol of diisocyanate. Using the disclosed reaction conditions, allophanate formation by reaction of urethane groups with isocyanate groups does not occur in these isocyanate compositions.

U.S. Pat. Nos. 4,115,429 and 4,118,411 disclose low temperature (i.e., as low as −5° C.) storage stable liquid diphenylmethane diisocyanates. These are produced by reacting diphenylmethane diisocyanates having a specified 2,4'-isomer content with propylene glycol or poly-1,2-propylene ether glycol. High levels of the 2,4'-isomer result in the desirable improved low temperature stability, however, these products exhibit considerably lower reactivity and also property changes in polyurethane elastomers (i.e., lower tensile strength).

Other liquid isocyanates are described in U.S. Pat. Nos. 4,490,300, 4,490,301 and 4,490,302. U.S. Pat. No. 4,490,300 discloses reaction products of MDI with an aliphatic diol having a pendant aromatic group, e.g., 2-methyl-2-phenyl-1,3-propanediol or phenyl-1,2-ethanediol. These liquid isocyanates are disclosed as being stable at room temperature. Other liquid isocyanates which are stable at room temperatures include those which comprise the reaction product of MDI with monoallylether of trimethylolpropane. Liquid isocyanate reaction products are also disclosed by U.S. Pat. No. 4,490,302. These comprise the reaction products of MDI with mixtures of monoalcohols, poly-1,2-propylene ether glycols and low molecular weight triols.

U.S. Pat. No. 4,738,991 discloses organic polyisocyanates which are characterized by allophanate linkages. These polyisocyanates are prepared by reacting an organic polyisocyanate and include, 2,4' and 4,4'-diphenylmethane diisocyanate with poly- or a monohydric alcohol in the presence of an organometallic catalyst. Deactivation of the catalyst is achieved using a compound such as an inorganic acid, organic acid, organic chloroformate or an organic acid chloride.

U.S. Pat. No. 4,866,103 discloses a polyisocyanate composition for use in producing elastomers in a RIM process. This composition is the product of reacting an alcohol or thiol having an average functionality of from about 1.5 to about 4 and an average equivalent weight of at least about 500 with at lest 2 equivalents per hydroxyl and/or thiol equivalent of an organic polyisocyanate including the 4,4'- and the 2,4'-isomers of diphenylmethane diisocyanate. These products are formed under conditions such that at least about 20% of the initially formed urethane or thiourethane groups are converted to allophanate and/or thioallophanate groups.

Other references relating to the preparation of allophanates containing isocyanate include GB Patent 994,890. This reference relates to the reaction of urethane isocyanates with excess diisocyanate either by heat alone or in the presence of a catalyst such as a metal carboxylate, a metal chelate or a tertiary amine, until the isocyanate content is reduced to that which is obtained theoretically when the complete reaction of the urethane groups is achieved.

U.S. Pat. No. 4,160,080 discloses a process for producing allophanate containing aliphatically and/or cycloaliphatically bound isocyanate groups in which compounds containing urethane groups are reacted with polyisocyanates having aliphatic and/or cycloaliphatic isocyanate groups, in the presence of a strong acid. The process is generally conducted at a temperature of from 90° C. to 140° C. for about 4 to 20 hours.

A method of preparing liquid diphenylmethane diisocyanate is disclosed by Japanese Patent Application No. 1971-99176. These are prepared by reacting diphenylmethane diisocyanate with aliphatic monovalent alcohol.

Novel, liquid diphenylmethane diisocyanates which contain allophanate linkages are also disclosed by U.S. Pat. Nos. 5,319,053 and 5,319,054. The liquid stable products of U.S. Pat. No. 5,319,053 are characterized by an NCO group content of 12 to 32.5%, and comprise the reaction product of an aliphatic alcohol and a specified mixture of isomers of diphenylmethane diisocyanate. This reference also discloses stable liquid MDI prepolymers which comprise the reaction product of the allophanate-modified MDI as described above, with an organic material containing two or more active hydrogen groups. U.S. Pat. No. 5,319,054 describes liquid allophanate modified MDI compositions which are storage stable at 25° C. The diphenylmethane diisocyanate has a specific isomer distribution requiring 2 to 60% by weight of 2,4'-diphenylmethane diisocyanate. The disclosed allophanate containing MDI prepolymers, although storage stable at 25° C., are substantially lower in reactivity with polyols when compared to stable liquid MDI's according to the present invention. Polyurethane elastomers prepared from allophanate modified MDI having higher 2,4'-isomer content as described in this reference also result in products with lower hardness and tensile strength.

Allophanate modified diphenylmethane diisocyanate prepolymers are described in U.S. Pat. No. 5,440,003. These products are stable liquids at 25° C., and comprise the reaction product of an isomeric mixture of diphenylmethane diisocyanate and an aromatic alcohol such as phenol, with the resultant product being converted to the allophanate having an NCO group content of 12 to 32% by weight.

U.S. Pat. No. 5,663,272 discloses allophanate modified MDI which is a storage stable liquid at 25° C. These compositions are prepared by reacting a monoisocyanate and an organic material having at least two hydroxyl groups and a molecular weight of 60 to 6,000 to form a urethane. The urethane is then reacted with an isomeric mixture of MDI to form an isocyanate product having an NCO group content of from 12 to 30%. This allophanate-modified MDI can be further reacted with an organic isocyanate-reactive material to form an allophanate-modified MDI prepolymer containing urethane, urea and/or biuret groups having an NCO group content of 5 to 29%. The use of monofunctional compounds in polyurethane formulations including prepolymers results in chain termination which yields lower molecular weight polyurethanes with inferior physical properties.

Polyisocyanate mixtures which are liquid at temperatures greater than 5° C. are disclosed by U.S. Pat. No. 5,610,260. These polyisocyanates have an NCO content of 14.5 to 24% by weight and an allophanate group content of 7.7 to 14.5% by weight. The polyisocyanates described comprise reaction products of 4,4'-diphenylmethane diisocyanate with one or more monohydric alcohols having 4 to 16 carbon atoms at an NCO:OH equivalent ratio of 5:1 to 8.5:1, and a temperature of up to 160° C. to form urethane groups, and during or subsequent to urethane formation, converting the urethane groups in the presence of a catalyst to allophanate groups. Allophanate modified liquid MDI products made by this process provide improved low temperature stability, but are much slower in reactivity compared with products of the present invention and result in polyurethane elastomers with considerable lower elasticity (i.e. elongation).

Mixtures of epoxide functional compounds and urethane prepolymers of allophanate-modified diphenylmethane diisocyanates are known and described in, for example, U.S. Pat. 5,783,652. The addition of the epoxide functional compound is described as increasing the reactivity by lowering the acidity of the urethane modified allophanate-modified MDI monomers.

Advantages of the present invention include low temperature stability combined with desirable reactivity comparable to liquid MDI/tripropylene glycol adducts and provision of excellent physical properties (combination of hardness, elongation, and tensile strength) in resulting polyurethane elastomers.

SUMMARY OF THE INVENTION

This invention relates to stable liquid polyisocyanate compositions characterized by improved freeze stability. These stable liquid polyisocyanate compositions have an NCO group content of from 15 to 30% (preferably of from 20 to 26%), and have a monomeric diphenylmethane diisocyanate content of less than 90% by weight, preferably of less than 70%. These stable liquid polyisocyanate compositions comprise:
  (A) an allophanate-modified MDI having an NCO group content of 16 to 32.5%, and comprising the reaction product of:
    (1) diphenylmethane diisocyanate containing from about 0 to about 20% by weight of the 2,4'-isomer, from about 0 to about 2% of the 2,2'-isomer, and the balance being the 4,4'-isomer, and
    (2) an aliphatic alcohol;
  (B) a low molecular weight branched aliphatic dihydroxy compound (preferably tripropylene glycol), and
  (C) an epoxide functional compound in the amount of 0.01 to 1% by weight, based on the combined weight of (A) and (B).

The present invention also relates to a process for the preparation of stable liquid polyisocyanate compositions characterized by improved freeze stability. This process comprises:
  (I) reacting
    (A) an allophanate-modified MDI having an NCO group content of 16 to 32.5% which comprises the reaction product of (1) diphenylmethane diisocyanate containing from about 0 to about 20% by weight of the 2,4'-isomer, from about 0 to about 2% by weight of the 2,2'-isomer and the balance being the 4,4'-isomer, and (2) an aliphatic alcohol; with
    (B) a low molecular weight branched aliphatic dihydroxy compound (preferably tripropylene glycol), thereby forming an allophanate-modified MDI prepolymer; and
  (II) adding
    (C) an epoxide functional compound to the allophanate-modified prepolymer,
wherein (C) is present in an amount of from 0.01 to 1% by weight, based on the combined weight of (A) and (B).

DETAILED DESCRIPTION OF THE INVENTION

As used herein with respect to the polyisocyanate compositions of the invention, the term stable means that the polyisocyanate composition has no more than a 1% absolute change in the NCO content and no more than a 10% change in the viscosity when stored at 25° C. for 3 months, and the term liquid means that the polyisocyanate composition does not precipitate solids when stored at 25° C. for 3 months.

In accordance with the present invention, suitable compositions to be used as component (A) include allophanate-modified MDI having an NCO group content of from 16 to 32.5%, preferably of 21 to 29%.

Suitable (A) allophanate-modified MDI for the present invention comprises the reaction product of:
  (1) diphenylmethane diisocyanate containing from about 0 to about 20% by weight of the 2,4'-isomer, from about 0 to about 2% by weight of the 2,2'-isomer and the balance being the 4,4'-isomer; and
  (2) an aliphatic alcohol.

The diphenylmethane diisocyanate suitable for component (A)(1) of the present invention has the isomer distribution as set forth above, wherein the sum of the %'s by weight of 2,2'-isomer, 2,4'-isomer and 4,4'-isomer must total 100% by weight of the diphenylmethane diisocyanate (A)(1). It is preferred that the diphenylmethane diisocyanate contains from about 0 to 10% by weight of the 2,4'-isomer, from about 0 to about 1% by weight of the 2,2'-isomer, and the balance being the 4,4'-isomer. Most preferably, the MDI contains from about 0 to 3% by weight of the 2,4'-isomer, from about 0 to 0.2% by weight of the 2,2'-isomer and the balance being the 4,4'-isomer.

Suitable aliphatic alcohols to be used as component (A)(2) can contain about 1 to 36 and preferably 4 to 16 carbon atoms. Illustrative but non-limiting examples of the aliphatic alcohols can be selected from the group consisting of cycloaliphatic alcohols, aliphatic alcohols containing aromatic groups, aliphatic alcohols containing groups that do not react with isocyanates, e.g. ether groups and halogens such as bromine and chlorine. Specific but non-limiting examples of the aliphatic alcohols can be selected from the group consisting of 2-methyl-1-propanol, cetylalcohol, cyclohexanol, 2-methoxyethanol, and 2-bromoethanol. Aliphatic alcohols for the present invention which are more preferred include the branched aliphatic alcohols such as, for example, isobutanol.

The allophanate-modified MDI, i.e., component (A) of this invention, can be prepared by, for example, the process disclosed in U.S. Pat. No. 5,319,053, the disclosure of which is herein incorporated by reference.

Suitable low molecular weight branched aliphatic dihydroxy compounds which are suitable to be used as component (B) of the present invention include, for example, branched aliphatic dihydroxy compounds such as, 2-ethyl hexanediol-(1,3), 2-methylpentane-diol-(2,4), 2,2,4-trimethylpentanediol-(1,3), 3-methyl-5-ethylheptane diol-(2,4), 2-methyl-2-propanediol-(1,3) or mixtures thereof. It is preferred to use poly-1,2-propylene ether glycols of molecular weight 134 to 700, such as dipropylene glycol, tripropylene glycol or polypropylene glycol or mixtures thereof. Tripropylene glycol is particularly preferred.

Any chemical compound which contains the epoxide (oxirane) functionality is suitable for component (C) in the polyisocyanate compositions of the present invention. The term "epoxide" or "epoxy" as used herein refers to any organic compound or resin comprising at least one group comprising a three membered oxirane ring. Preferably, two or more oxirane groups are present in the epoxide compound or resin in order to obtain the polyisocyanate compositions with consistent reactivity profiles of the instant invention. The epoxide equivalent weight (EEW) range of suitable epoxides is from about 44 to 400, preferably 100 to 350 and most preferably 150 to 300. Both aliphatic mono- and polyepoxides may be used, and are well known.

It is somewhat less preferred that the epoxy contains an aromatic group due to the tendency of them to cause yellowing as well as their reduced efficacy. Examples of such aromatic group containing polyepoxides include but are not limited to those selected from the group consisting of the polyglycidyl ethers of polyhydric phenols; glycidyl esters of aromatic carboxylic acids; N-glycidylaminoaromatics such as N-glycidylaminobenzene, N,N,N',N'-tetraglycidyl-4,4'-bis-aminophenyl methane, and diglycidylaminobenzene; glycidylaminoglycidyloxy-aromatics such as glycidylaminoglycidyloxybenzene; and mixtures thereof.

The preferred epoxides for use according to the invention are the aliphatic epoxides which do not contain hydroxyl groups.

Suitable for use are $C_2$–$C_{10}$ aliphatic epoxides such as, for example, ethylene oxide, propylene oxide, 1,2-butene oxide, 2,3-butene oxide (cis and/or trans), isobutylene oxide, 1,2-pentene oxide, 2,3-pentene oxide, cyclopentene oxide, 1,2-hexene oxide, cyclohexene oxide, and the like and mixtures thereof.

Examples of useful aliphatic polyepoxides include but are not limited to those selected from the group consisting of vinyl cyclohexene dioxide; butadiene dioxide; and those containing ether linkages such as triglycidyl isocyanurate, triglycidyl pentaerythritol, tetraglycidyl pentaery-thritol, diglycidylethers of cylcohexane dimethanol and the diglycidylethers of other diols known to those skilled in the art, 1,4-bis(2,3-epoxypropoxy)-benzene; 1,3-bis(2,3-epoxypropoxy)benzene; 4,4'-bis(2,3-epoxypropoxy)-diphenyl ether; 1,8-bis(2,3-epoxypropoxy)octane; 1,4-bis(2,3-epoxypropoxy)cyclohexane; 4,4'-(2-hydroxy-3,4-epoxybutoxy)-diphenyl dimethyl methane; 1,3-bis(4,5-epoxypentoxy)-5-chlorobenzene; 1,4-bis(3,4-epoxybutoxy)-2-chlorocyclohexane; diglycidyl thioether; diglycidyl ether; 1,2,5,6-diepoxyhexane-3; 1,2,5,6-diepoxyhexane; those containing ester groups such as ERL 4221, a product of Union Carbide Corporation, illustrated in U.S. Pat. No. 4,814,103, the disclosure of which is herein incorporated by reference, and mixtures thereof.

Other useful epoxides are listed in, for example, U.S. Pat. No. 3,298,998, the disclosure of which is herein incorporated by reference. These compounds include but are not limited to those selected from the group consisting of bis[p-(2,3-epoxypropoxy)phenyl]cyclohexane; 2,2-bis[p-(2,3-epoxypropoxy)phenyl]norcamphane; 5,5-bis[(2,3-epoxypropoxy)phenyl]hexahydro-4,6-methanoindane; 2,2-bis[4-(2,3-epoxypropoxy)-3-methylphenyl]hexahydro-4,7-methanoindane; and 2-bis[p-2,3-epoxypropoxy)phenyl]-methylene-3-methylnorcamphane; and mixtures thereof. Other usable epoxides are found in, for example, Handbook of Epoxy Resin, Lee and Neville, McGraw-Hill, New York (1967) and U.S. Pat. No. 3,018,262, both of which are herein incorporated by reference.

Also, suitable epoxides for use in the present invention include the epoxidized dimer and trimer fatty acids, which are formed by epoxidizing the products of the polymerization of $C_{18}$ unsaturated fatty acids such as oleic acid, linoleic acid, linolenic acid, elaidic acid and the like. The use of a dimer or trimer fatty acid entity furnishes a higher molecular weight epoxide that is less likely to volatilize from the finished articles that the polyisocyanate compositions of the present invention are used to produce. The dimer fatty acid may have an acyclic, monocyclic, or bicyclic structure or comprise a mixture of compounds having different such structures.

Epoxidized mono-, di- and triglycerides prepared by epoxidation of the known unsaturated or partially unsaturated glycerides are preferred. The epoxidized glycerides may be prepared from any of the known fatty acid triglycerides available from natural or synthetic sources. The fatty acid group, which is connected to glycerol by an ester bond is usually a $C_6$–$C_{24}$ monocarboxylic acid (linear or branched; saturated, monounsaturated, or polyunsaturated). Such fatty acids and their equivalents are readily available at low cost from natural sources such as edible triglycerides. Specific illustrative fatty acids suitable for use include, but are not limited to, eicosanoic (arachidic) acid, heneicosanoic acid, docosanoic (behenic) acid, elaidic acid, tricosanoic acid, tetracosanoic (lignoceric) acid, caprylic acid, pelargonic acid, capric acid, caproic acid, lauric acid, palmitic acid, stearic acid, oleic acid, cetoleic acid, myristic acid, palmitoleic acid, gadoleic acid, erucic acid, rincinoleic acid, linoleic acid, linolenic acid, myristoleic acid, eleostearic acid, arachidonic acid, or mixtures or hydrogenated derivatives of these acids. The fatty acids may be derived synthetically or from natural sources such as triglyceride lipids. Mixtures of fatty acid entities, such as the mixtures of fatty acids typically obtained by hydrolysis (splitting) of a triglyceride are also suitable. These fatty acid triglycerides include, but are not limited to, fats and oils such as tallow, soybean oil, cottonseed oil, coconut oil, palm kernel oil, corn oil, fish oil, lard, butterfat, olive oil, palm oil, peanut oil, safflower seed oil, cocoa butter, sesame seed oil, rapeseed oil, sunflower seed oil, as well as fully or partially hydrogenated derivatives and mixtures of these triglycerides. Epoxidized linseed oil is particularly preferred.

A process for preparing the liquid polyisocyanate compositions of the present invention includes the following steps:

Diphenylmethane diisocyanate is charged to a reactor and heated to about 60° C. under agitation. A calculated amount of the chosen aliphatic alcohol containing 1 to 36 carbon atoms is added, followed by the catalytic amounts of zinc acetylacetonate or other suitable catalyst. The reaction mixture is stirred at 90° C. until the calculated NCO content is reached (i.e., about 16 to about 32.5% NCO). At this time, a small amount of benzoyl chloride (or other suitable stopper) is added to deactivate the catalyst. The allophanate-modified MDI is subsequently cooled to 60° C. and a calculated amount of a branched aliphatic dihydroxy compound is added and reacted with the allophanate-modified MDI until the calculated isocyanate content is reached (i.e., about 15 to about 30% NCO). Before or after cooling to 25° C., a small amount of the epoxide functional compound is added (i.e., 0.01 to 1% based on the combined weight of components (A) and (B)). The final isocyanate content, the viscosity, and the freezing point are determined and the product is stored until used in the preparation of a polyurethane.

As used herein, the term "improved freeze stability" with respect to the presently claimed isocyanate compositions means that these isocyanate compositions are stable liquids at less than 20° C., and preferably at less than 15° C. for 30 days or more.

Applicants copending application Ser. No. 09/499,603, now issued U.S. Pat. No. 6,242,556, which is commonly assigned, also describes liquid MDI adducts having improved freeze stability. These compositions comprise a blend of (A) an MDI adduct having an NCO group content of 15 to 30%, and (B) an allophanate-modified MDI having an NCO group content of 12 to 32.5%.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

Epoxy A: an epoxidized linseed oil having an epoxide equivalent weight of about 180, commercially available as Epoxol® 9-5 from American Chemical Service, Inc.

Isocyanate A: diphenylmethane diisocyanate having an isomer distribution comprising about 98% by weight of the 4,4'-isomer, and less than 2% by weight of the 2,4'-isomer. This diisocyanate has an NCO content of about 33.6% and a functionality of 2.0 This isocyanate is a solid at 25° C.

Isocyanate B: diphenylmethane diisocyanate having an isomer distribution comprising about 44% by weight of the 4,4'-isomer, 54% by weight of the 2,4'-isomer and about 2% by weight of the 2,2'-isomer. This isocyanate has an NCO content of about 33.6%, a functionality of about 2.0 and a viscosity of less than about 25 mPa·s at 25° C.

Isocyanate C: an isocyanate prepolymer having an NCO group content of about 23%, a viscosity between 550 and about 800 mPa·s at 25° C. and comprising the reaction product of about 86.2% by weight of isocyanate A and about 13.8% by weight of tripropylene glycol. This prepolymer is stable for at least 30 days at temperatures of 20° C. or greater, but freezes below 15° C.

Isocyanate D: an isocyanate having an NCO group content of about 23%, a viscosity between 400 and about 700 mPa·s at 25° C. and comprising the reaction product of about 86.2% by weight of isocyanate B and about 13.8% by weight of tripropylene glycol. This prepolymer is stable for at least 30 days at temperatures of 0° C. or greater.

Isocyanate E: 100 parts by weight of isocyanate A and 5.45 parts by weight of 2-methyl-i-propanol were charged to a stirred reactor and heated to 60° C. 0.01 part of zinc acetylacetonate was added and the stirred reaction mixture was heated to 90° C. After one hour at 90° C., the NCO content was 26%. The reaction mixture was cooled to 60° C. and 0.025 part of benzoyl chloride was added. The reaction mixture was cooled to 40° C. and stored at 40° C. until used.

Isocyanate F: 95.7 parts by weight of the isocyanate E were charged to a reactor and heated to 60° C. 4.3 parts by weight of tripropylene glycol were added to the stirred isocyanate at such rate that the temperature was maintained at 60° C.±5° C. The reaction mixture was held at 60° C. for about 2 hours. Before cooling to 25° C., 0.2 parts of Epoxy A were added. The resultant product, which had an isocyanate group content of 23%, was a clear yellow liquid with a viscosity of 450 to 600 mpa·s at 25° C. This prepolymer was stable for at least 30 days at temperatures of 10° C. or greater.

Isocyanate G: same as isocyanate F; without Epoxy A. Like Isocyanate F, Isocyanate G was stable for at least 30 days at temperatures of 10° C. or greater.

Isocyanate H: same as isocyanate E; but the quantity of 2-methyl-1-propanol was increased to 7.74 parts by weight, which resulted in an NCO content of 23% and a viscosity between 400 and about 650 mPa·s.

Polyol 1: a propylene glycol started propylene oxide polyether polyol, having an OH number of about 112, a functionality of about 2 and a molecular weight of about 1000.

Polyol 2: a propylene glycol started propylene oxide/ethylene oxide (80:20 wt. ratio) polyether polyol, having an OH number of about 28, a functionality of about 2 and a molecular weight of about 4000.

Polyol 3: a glycerol started propylene oxide/ethylene oxide (87:13 wt. ratio) polyether polyol, having an OH number of about 35, a functionality of about 3 and a molecular weight of about 4800.

Polyol 4: a trimethylolpropane started propylene oxide polyether polyol, having an OH number of about 370, a functionality of about 3 and a molecular weight of about 450.

Polyol 5: a glycerol started propylene oxide/ethylene oxide (87:13 wt. ratio) polyether polyol, having an OH number of about 28, a functionality of about 3 and a molecular weight of about 6000.

Polyol 6: 1,4-butanediol.

Baylith L Paste: a mixture of synthetic alumino-silicate in castor oil.

Dow Corning Antifoam 1400: 100% silica-filled polydimethyl siloxane, an FDA approved antifoaming agent used to prevent foam in food and chemical processes.

Catalyst A: a dibutyltin dilaurate catalyst, commercially available as Dabco T-12 from Air Products and Chemical Inc. Allentown, Pa.

The following polyol blends were used in the examples:

Polyol Blend A comprised:
52.43 pbw Polyol 1
28.23 pbw Polyol 2
10.08 pbw Polyol 6
9.07 pbw Baylith Paste L
0.13 pbw Dow Corning Antifoam 1400
0.005 pbw Catalyst A Polyol Blend A was characterized by an equivalent weight of 281.

Polyol Blend B comprised:
63.53 pbw Polyol 3
18.18 pbw Polyol 4
9.09 pbw Polyol 6
9.09 pbw Baylith Paste L
0.1 pbw Dow Corning Antifoam 1400
0.005 pbw Catalyst A Polyol Blend B was characterized by an equivalent weight of 267.

Polyol Blend C comprised:
81 pbw Polyol 5
18 pbw Polyol 6
1 pbw Baylith Paste L
0.1 pbw Dow Corning Antifoam 1400
0.005 pbw Catalyst A Polyol Blend C was characterized by an equivalent weight of 226.

The polyurethane castings in Examples 1–3, as set forth in Table 1, were prepared according to the following procedure:

The polyol blend and the isocyanate were hand mixed at 25–30° C. for 1.5–2.0 minutes, and then cast into a bookcase mold pre-heated to 105–110° C., which measured 8 in.×16 in.×0.125 in. and into button molds (also pre-heated to 105–110° C.). The cast samples were allowed to cure at 105–110° C. in the molds for 16 hours, before being demolded. After 1 week at room temperature in a temperature and humidity-controlled environment, the samples were tested for various physical and mechanical properties. The results are set forth in Table 1 below.

TABLE 1

Examples Using Linear Polyol Blend A: Examples 1–3 are comparative

|  | Example 1 | Example 2 | Example 3 |
| --- | --- | --- | --- |
| Polyol Blend A (grams) | 250 | 250 | 250 |
| Isocyanate C (grams) | 170.7 | 85.35 |  |
| Isocyanate D (grams) |  | 85.35 | 170.7 |
| NCO:OH Ratio | 1.05 | 1.05 | 1.05 |
| Tensile Strength (psi) | 2178 | 1711 | 1691 |
| 100% Modulus (psi) | 687 | 564 | 281 |
| Elongation (%) | 358 | 354 | 493 |
| Die C Tear (pli) | 263 | 223 | 177 |

TABLE 1-continued

Examples Using Linear Polyol Blend A: Examples 1–3 are comparative

|  | Example 1 | Example 2 | Example 3 |
| --- | --- | --- | --- |
| Split Tear (pli) | 47 | 52 | 47 |
| Hardness Shore A (1 sec/5 sec) | 78/75 | 77/73 | 65/58 |
| Compression Set | 25 | 37 | 42 |
| Taber Abrasion (wt. loss in mg/1000 cycles) | 214 | 184 | 230 |

Examples 2 and 3 represented different versions of Isocyanate C with increasing 2,4'-isomer content. Correspondingly, the freeze stability was increased (to below 0° C. in Example 2, and to −20° C. in Example 3). At the same catalyst level, gel times increased with increasing 2,4'-isomer content. Physical properties show a decrease in hardness and tensile strength and an increase in elongation. Therefore, the approach to use increasing 2,4'-isomer contents to increase freeze stability does not represent a suitable approach to substitute Isocyanate C.

The polyurethane castings in Examples 4–7, as set forth in Table 2, were prepared according to the following procedure:

The polyol blend and the isocyanate were hand mixed at 25–30° C. for 1.5–2.0 minutes, and then cast into a room temperature book-case mold which measured 8 in.×16 in.× 0.125 in. and into room temperature button molds. The cast samples were allowed to cure at 105–110° C. in the molds for 16 hours, before being demolded. After 1 week at room temperature in a temperature and humidity-controlled environment, the samples were tested for various physical and mechanical properties. The results are set forth in Table 2 below.

TABLE 2

Examples Using Polyol Blends B and C: Examples 4 and 6 are comparative

|  | Example 4 | Example 5 | Example 6 | Example 7 |
| --- | --- | --- | --- | --- |
| Polyol Blend B (grams) | 250 | 250 |  |  |
| Polyol Blend C (grams) |  |  | 250 | 250 |
| Isocyanate B (grams) | 179.7 |  | 211.8 |  |
| Isocyanate F (grams) |  | 179.7 |  | 211.8 |
| NCO:OH Ratio | 1.05 | 1.05 | 1.05 | 1.05 |
| Tensile Strength (psi) | 2858 | 3094 | 2696 | 2808 |
| 100% Modulus (psi) | 1850 | 1920 | 1959 | 1899 |
| Elongation (%) | 179 | 169 | 362 | 311 |
| Die C Tear (pli) | 219 | 257 | 380 | 456 |
| Split Tear (pli) | 59 | 74 | 190 | 163 |
| Hardness Shore A (1 sec/5 sec) | 94/92 | 94/93 | 98/98 | 98/98 |
| Compression Set | 18.1 | 15.2 | 43.7 | 53.6 |
| Taber Abrasion (wt. loss in mg/1000 cycles) | 165 | 188 | 21 | 115 |

According to the present invention, Isocyanate F exhibits the desirable lower freezing point (5° C.) versus Isocyanate C (15° C.). In both formulations (Polyol Blend B in Examples 4 & 5; and Polyol Blend C in Examples 6 and 7), Isocyanate F also shows similar reactivity and physical properties, when compared with Isocyanate C.

TABLE 3

Examples Demonstrating Different Reactivity: Example 8, 10 and 11 are comparative

|  | Example 8 | Example 9 | Example 10 | Example 11 |
|---|---|---|---|---|
| Polyol Blend B (grams) | 250 | 250 | 250 | 250 |
| Isocyanate C (grams) | 179.7 | | | |
| Isocyanate F (grams) | | 179.7 | | |
| Isocyanate G (grams) | | | 179.7 | |
| Isocyanate H (grams) | | | | 179.7 |
| NCO:OH Ratio | 1.05 | 1.05 | 1.05 | 1.05 |
| Geltime (min, at 0.002% Catalyst Level) | 10 | 10 | 27 | 30 |

Examples 8–11 show that the reactivity of Isocyanate F (according to the invention) is identical to Isocyanate C (comparison, according to Koenig, U.S. Pat. No. 3,644,457). Isocyanate H (comparison, according to Slack U.S. Pat. No. 5,319,053) reacts considerably slower with Polyol Blend B. Isocyanate G, without the addition of Epoxol 9-5, also reacts significantly slower than Isocyanate C and F.

TABLE 4

Examples Using Linear Polyol Blend A: Example 13 is comparative

|  | Example 12 | Example 13 |
|---|---|---|
| Polyol Blend A (grams) | 250 | 250 |
| Isocyanate G (grams) | 170.7 | |
| Isocyanate H (grams) | | 170.7 |
| NCO:OH Ratio | 1.05 | 1.05 |
| Tensile Strength (psi) | 1214 | 1349 |
| 100% Modulus (psi) | 556 | 751 |
| Elongation (%) | 632 | 341 |
| Die C Tear (pli) | 236 | 286 |
| Split Tear (pli) | 134 | 159 |
| Hardness Shore A (1 sec/5 sec) | 85/83 | 81/79 |
| Compression Set | 86 | 75.6 |
| Taber Abrasion (wt. loss in Mg/1000 cycles) | 225 | 185 |

The polyurethane castings in Examples 12 and 13 (comparison), as set forth in Table 4, were prepared according to the procedure for Examples 1–3.

Examples 12 and 13 show that Isocyanate H generates a softer elastomer with considerably lower elongation when compared with Isocyanate G (according to the invention).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a stable liquid polyisocyanate composition which is characterized by improved freeze-stability, comprising
   (I) reacting
      (A) an allophanate-modified MDI having an NCO group content of 16 to 32.5%, which comprises the reaction product of (1) diphenylmethane diisocyanate containing from about 0 to about 20% by weight of the 2,4'-isomer, from about 0 to about 2% by weight of the 2,2'-isomer, and the balance being the 4,4'-isomer, and (2) an aliphatic alcohol; with
      (B) a low molecular weight branched aliphatic dihydroxy compound comprising a poly-1,2-propylene ether glycol having a molecular weight of 134 to 700, thereby forming an allophanate-modified MDI prepolymer; and
   (II) adding
      (C) an epoxide functional compound to the allophanate-modified prepolymer,
      wherein the amount of (C) is such that there is from about 0.01 to 1% by weight of (C), based on the combined weight of (A) and (B).

2. The process of claim 1, wherein the amount of (C) is such that there is from about 0.01 to about 0.2% by weight of (C), based on the combined weight of (A) and (B).

3. The process of claim 1, wherein the NCO group content is from 20 to 26% by weight and the monomeric diphenylmethane diisocyanate content is less than 70% by weight.

4. The process of claim 2, wherein
   (A) the allophanate-modified MDI has an NCO group content of 21 to 29%, and comprises the reaction product of:
      (1) diphenylmethane diisocyanate containing from about 0 to about 10% by weight of the 2,4'-isomer, from about 0 to about 1% of the 2,2'-isomer, and the balance being the 4,4'-isomer, and
      (2) an aliphatic alcohol having from about 1 to about 36 carbon atoms.

5. The process of claim 4, wherein
   (A) the allophanate-modified MDI comprises the reaction product of:
      (1) diphenylmethane diisocyanate containing from about 0 to about 3% by weight of the 2,4'-isomer, from about 0 to about 0.2% of the 2,2'-isomer, and the balance being the 4,4'-isomer, and
      (2) an aliphatic alcohol having from about 4 to about 16 carbon atoms.

6. The process of claim 5, wherein (A)(2) said aliphatic alcohol comprises isobutanol.

7. The process of claim 1, wherein said poly-1,2-propylene ether glycol is selected from the group consisting of dipropylene glycol, tripropylene glycol, polypropylene glycol and mixtures thereof.

8. The process of claim 7, wherein said poly-1,2-propylene ether glycol comprises tripropylene glycol.

9. The process of claim 2, wherein (C) said epoxide functional compound has an epoxide equivalent weight of from about 44 to about 400.

10. The process of claim 9, wherein (C) comprises epoxidized linseed oil.

* * * * *